United States Patent
Dextraze

(10) Patent No.: US 10,455,881 B2
(45) Date of Patent: Oct. 29, 2019

(54) ADJUSTABLE HEADGEAR MOUNT SYSTEM

(71) Applicant: Serge Dextraze, St-Jean-sur-Richelieu (CA)

(72) Inventor: Serge Dextraze, St-Jean-sur-Richelieu (CA)

(73) Assignee: CADEQUIP, INC., St-Jean-sur-Richelieu, Quebec (CA)

( * ) Notice: Subject to any disclaimer, the term of this patent is extended or adjusted under 35 U.S.C. 154(b) by 209 days.

(21) Appl. No.: 15/291,036

(22) Filed: Oct. 11, 2016

(65) Prior Publication Data

US 2018/0206576 A1     Jul. 26, 2018

Related U.S. Application Data

(63) Continuation-in-part of application No. 15/135,532, filed on Apr. 21, 2016, now abandoned.

(60) Provisional application No. 62/150,835, filed on Apr. 21, 2015.

(51) Int. Cl.
*A42B 3/04* (2006.01)
*F16M 13/04* (2006.01)

(52) U.S. Cl.
CPC ............ *A42B 3/042* (2013.01); *A42B 3/04* (2013.01); *F16M 13/04* (2013.01)

(58) Field of Classification Search
CPC ........ F41C 27/00; F41C 27/16; F41G 11/003; F41G 11/004; Y10T 407/1922
USPC ........................................................ 224/181
See application file for complete search history.

(56) References Cited

U.S. PATENT DOCUMENTS

| | | | | |
|---|---|---|---|---|
| 3,497,935 A | | 3/1970 | Bowling | |
| 4,449,787 A | * | 5/1984 | Burbo | A42B 3/042 313/524 |
| 4,494,328 A | * | 1/1985 | Stevens | F41G 1/34 42/115 |
| 4,697,783 A | * | 10/1987 | Kastendieck | A42B 3/042 2/10 |
| 5,031,492 A | * | 7/1991 | Zinner | B23B 29/043 407/107 |
| 5,339,464 A | * | 8/1994 | Dor | G02B 23/125 2/6.2 |
| 5,467,479 A | * | 11/1995 | Mattes | A42B 3/04 2/422 |
| 5,471,678 A | * | 12/1995 | Dor | A42B 3/042 2/422 |
| 5,535,053 A | * | 7/1996 | Baril | G02B 23/125 250/214 VT |
| 5,542,627 A | * | 8/1996 | Crenshaw | A42B 3/04 2/6.3 |

(Continued)

*Primary Examiner* — Brian D Nash
(74) *Attorney, Agent, or Firm* — FisherBroyles LLP; Anthony J DoVale

(57) ABSTRACT

An adjustable headgear mount device and system is presented. The mount system comprises an adjustable locking catch that is adjustable by the user to accommodate a various range of male bayonet parts. A receiver element defines a slot that the adjustable locking catch is positioned in. The user can slide the catch into a desired position in the slot and securely fix the catch in the desired position with at least one set screw. In the desired position, the catch can engage a portion of the male bayonet. The catch can be moved to a different position by the user if a different size male bayonet part is desired to be attached to the headgear.

13 Claims, 7 Drawing Sheets

(56) References Cited

U.S. PATENT DOCUMENTS

| | | | |
|---|---|---|---|
| 6,385,892 B1* | 5/2002 | Vendetti | F41C 27/00 42/86 |
| 6,957,449 B2* | 10/2005 | Prendergast | A42B 3/04 2/422 |
| 7,219,370 B1* | 5/2007 | Teetzel | A42B 3/04 2/422 |
| 7,735,159 B2* | 6/2010 | Prendergast | F16M 11/041 2/422 |
| 7,963,426 B2* | 6/2011 | Gruebel | H01R 13/73 2/422 |
| 8,209,780 B1* | 7/2012 | Lemire | A42B 3/04 2/422 |
| 8,246,277 B2* | 8/2012 | Hecht | B23B 27/04 407/85 |
| 8,631,981 B2* | 1/2014 | Zusman | F41C 33/0227 224/243 |
| 8,661,571 B1* | 3/2014 | Teetzel | A42B 3/04 2/422 |
| 8,739,313 B2* | 6/2014 | Teetzel | A42B 3/04 2/6.6 |
| 8,971,959 B2* | 3/2015 | Hunt | F41G 11/004 455/556.1 |
| 9,243,870 B2* | 1/2016 | Teetzel | G02B 23/125 |
| 9,414,633 B2* | 8/2016 | Giroux Bernier | A42B 1/24 |
| 9,709,792 B2* | 7/2017 | Teetzel | G02B 23/18 |
| 9,958,667 B2* | 5/2018 | DiCarlo | A42B 3/042 |
| 10,299,528 B2* | 5/2019 | Dextraze | A42B 3/04 |
| 2005/0229465 A1* | 10/2005 | Dextraze | F41G 11/003 42/85 |
| 2006/0179704 A1* | 8/2006 | Dextraze | F41G 1/393 42/126 |
| 2007/0152406 A1* | 7/2007 | Prendergast | A42B 3/04 279/2.1 |
| 2008/0236018 A1* | 10/2008 | Halverson | F41G 1/16 42/135 |
| 2011/0239354 A1* | 10/2011 | Celona | A42B 3/04 2/422 |
| 2013/0312309 A1* | 11/2013 | Rorick | F41G 11/003 42/114 |
| 2017/0191776 A1* | 7/2017 | Dextraze | F41A 19/10 |
| 2017/0209805 A1* | 7/2017 | Dil | B01D 3/08 |
| 2017/0296191 A1* | 10/2017 | Shelton, IV | A61B 17/072 |
| 2018/0206577 A1* | 7/2018 | Dextraze | A42B 3/04 |

* cited by examiner

ADJUSTABLE HEADGEAR MOUNT SYSTEM

CROSS-REFERENCE TO RELATED PATENT APPLICATIONS

This application is a continuation-in-part application of copending U.S. patent application Ser. No. 15/135,532 filed on Apr. 21, 2016, which claims the benefit of U.S. Provisional Application No. 62/150,835, filed on Apr. 21, 2015 each of which applications are herein incorporated by reference in their entirety.

FIELD OF THE INVENTION

This invention relates generally to a mount for use with a headgear. More specifically, the invention relates to an adjustable mount system to mount various components to a headgear.

BACKGROUND OF THE INVENTION

The invention is particularly suited for use with night vision devices or other components for mounting on a headgear, such as a helmet and the like. For the purposes of discussion, we'll discuss night vision devices that are commonly used by military personnel for conducting operations in low light or night conditions. The night vision devices used by the military typically include image intensifier tubes and associated optics that convert infrared and near infrared light into viewable images.

Night vision mounting assemblies allow a user's hands to remain free while the user views a scene through the night vision device. Various assemblies for attaching night vision goggles to a night vision goggle headgear mount exist, including a goggle horn or bayonet assembly and a dovetail assembly.

Various manufacturers make each type of connector to mount their apparatuses thereon the top of a headgear. Accordingly, the size of each of the different manufacturers' design may not be exactly the same. As such, a dovetail male assembly of one manufacturer may not fit perfectly with a dovetail female assembly of another manufacturer. The same is true for the bayonet configuration. If there is not a snug, secure fit, the devices may rattle, jiggle, or fall off, which is a major issue.

What is needed in the art is a universal assembly that works with many, if not all, brands of mounts.

SUMMARY

Presented herein is an adjustable headgear mount device and system for securely and easily mounting bayonet devices of varying size to a headgear. A conventional bayonet device comprises a male protrusion with a clipping lever and a female receiver. In one aspect, the mount system comprises an adjustable catch and a receiver element. In another aspect, a female receiver cavity can be defined in a portion of the receiver element, the cavity configured to receive at least a portion of the male protrusion of the bayonet device therein. An elongate slot can be defined in the receiver element adjacent to the female receiver cavity.

In another aspect, a portion of the adjustable catch can be positioned in the female receiver cavity and can slide longitudinally forward and rearward in the slot. A tooth of the adjustable catch can extend into the female receiver cavity and can be configured to engage the clipping lever of the bayonet device. The catch can be adjusted to a desired position relative to the front of the mount system by the user to accommodate a various range of male bayonet parts. In the desired position, the male protrusion of the bayonet device can be inserted into the female receiver cavity of the mount system, and the catch can engage the clipping lever to securedly attach the bayonet device to the mount system.

Related methods of operation are also provided. Other apparatuses, methods, systems, features, and advantages of the adjustable headgear mount system will be or become apparent to one with skill in the art upon examination of the following figures and detailed description. It is intended that all such additional apparatuses, methods, systems, features, and advantages be included within this description, be within the scope of the adjustable headgear mount system, and be protected by the accompanying claims.

DESCRIPTION OF THE FIGURES

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

DESCRIPTION OF THE INVENTION

Figure 1A:
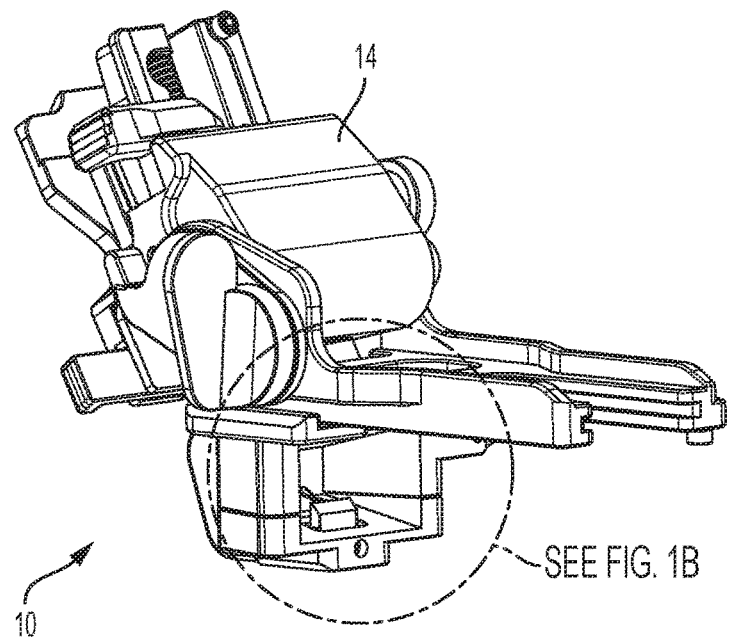
FIG. 1A is a perspective section view of one aspect of a headgear mount system having a bayonet connector.

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "mount" includes aspects having two or more mounts unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

In one aspect, presented herein is a headgear mount device and system 10 for attaching a device having a bayonet connector 12 to a headgear mount 14, as shown in FIGS. 1-6. Generally, bayonet devices comprise a male protrusion with a clipping lever 16. In one aspect, the headgear mount system defines a female receiver cavity 18 configured to receive at least a portion of the male protrusion of the bayonet connector. The headgear mounting device and system can be an adapter device configured to be adjustable so that a variety of different sized bayonet connectors can be securely and easily attached to the headgear mount.

The headgear mount system 10 comprises an adjustable catch 20 positioned therein the female receiver cavity, the catch being adjustable by the user to accommodate and/or engage a various range of male bayonet parts. For example, the position of the catch can be adjusted forward relative to the headgear mount 14 in order to accommodate and/or engage a portion of a small bayonet connector 12. In another example, the position of the catch 20 can be adjusted rearward relative to the headgear mount in order to accommodate and/or engage a portion of a large bayonet connector.

Figure 1B:
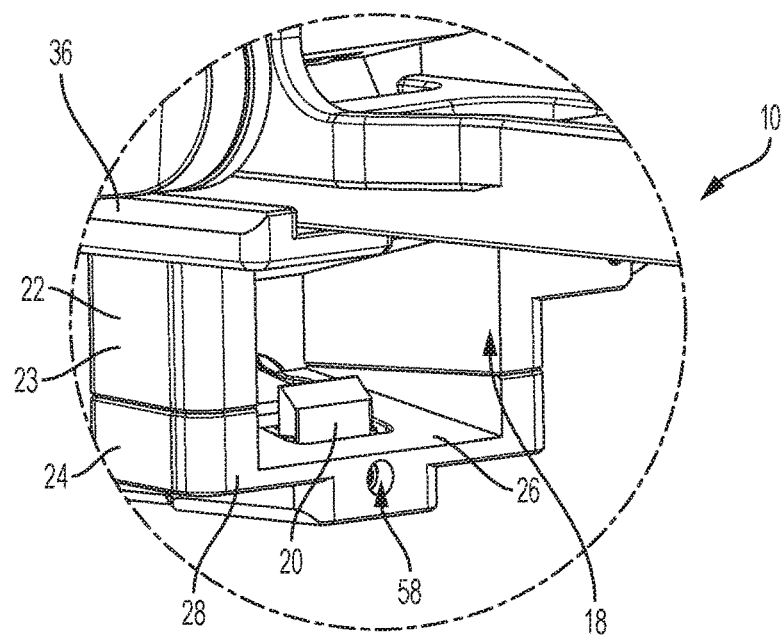
FIG. 1B is a magnified perspective section view of the headgear mount system of FIG. 1A.
Figure 2A:
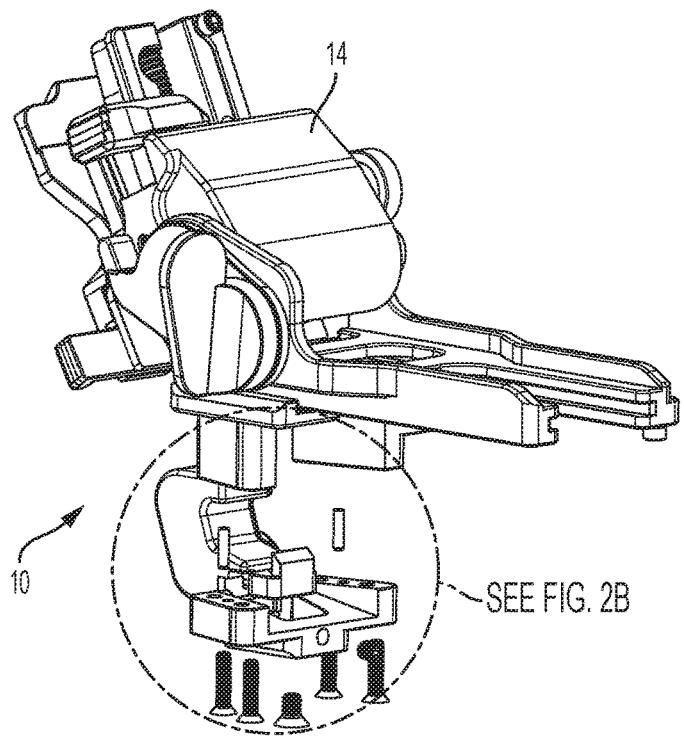
FIG. 2A is a partially exploded perspective section view of the headgear mount system of FIG. 1A.
Figure 2B:
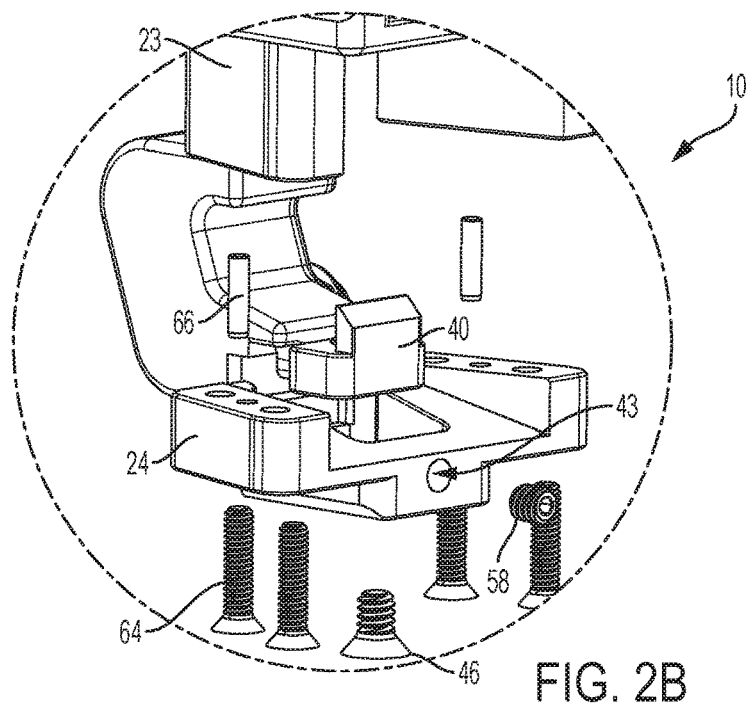
FIG. 2B is a magnified partially exploded perspective section view of the headgear mount system of FIG. 2A showing a receiver element and an adjustable catch.

As illustrated in FIG. 1, the female receiver cavity 18 can be defined in a receiver element 22. In one aspect, the receiver element can comprise a receiver top element 23 and a receiver bottom element 24 that are coupled together and that cooperate to define the female receiver cavity. Optionally, the receiver element cavity can be defined in a single monolithic receiver element. As can be appreciated, an upper surface 26 of the bottom element forms a lower surface of the female receiver cavity 16. In a further aspect, the upper surface can be tapered from the front surface 28 of the receiver bottom element 24 toward the rear surface 30 such that the cavity height decreases from the front surface 28 of the receiver bottom element 24 toward the rear. Similarly, a first sidewall 32 and/or a second sidewall 34 of the receiver bottom element 24 can be tapered from the front surface of the receiver bottom element toward the rear 30 such that the cavity width decreases from the front surface 28 of the receiver bottom element 24 toward the rear. In still a further aspect, the headgear mount system 10 further comprises a mounting bracket 36. The mounting bracket can be configured to couple the headgear mount system to the headgear mount 14.

Figure 4:
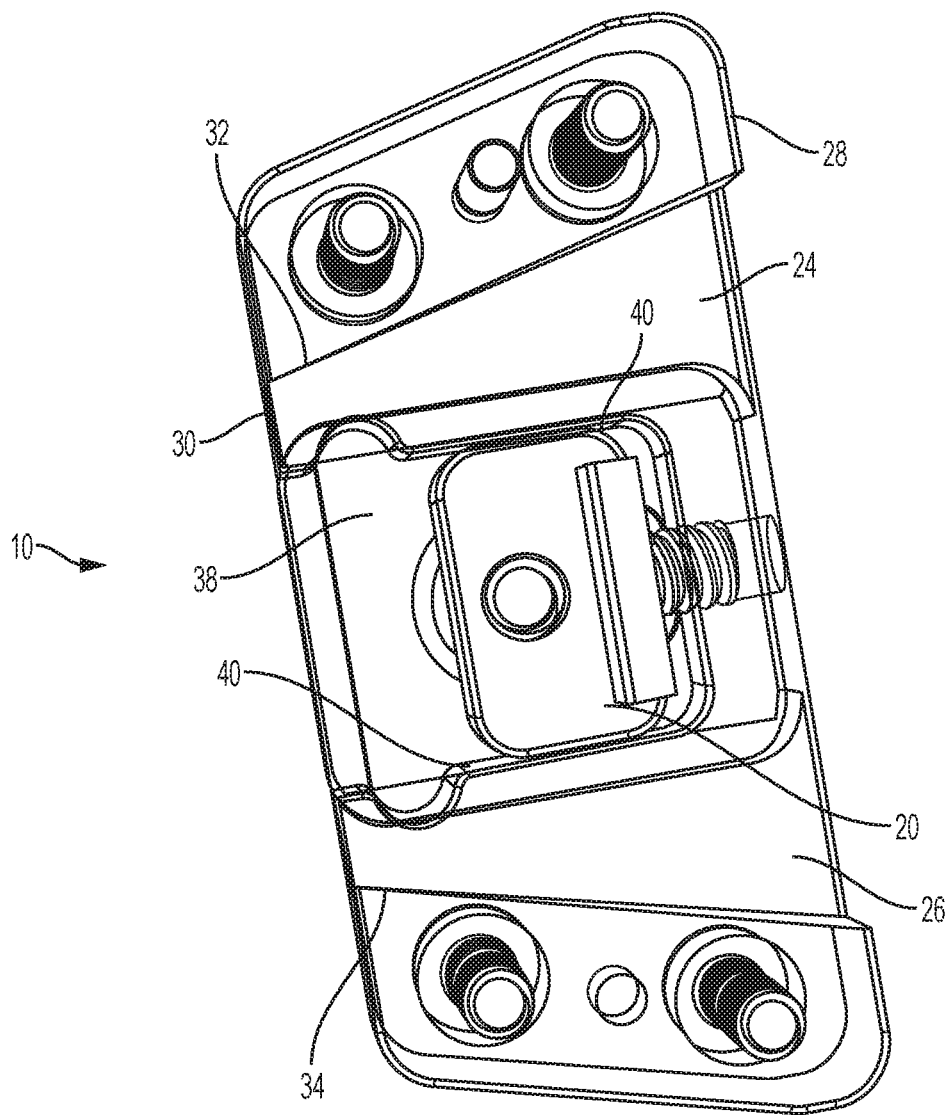
FIG. 4 is an upper perspective view of one aspect of the receiver element and adjustable catch of FIG. 1A, in which portions of the receiver element are shown transparently for clarity.

As illustrated in FIG. 4, in one aspect, a slot 38 can be defined in the upper surface 26 of the receiver bottom element 24. In this aspect, the slot can be sized and shaped such that, when assembled, at least a portion of the adjustable catch 20 can be positioned in the slot 38, and a portion of the adjustable catch can extend upward from the slot and into the female receiver cavity 18. In another aspect, the slot can permit the catch 20 to be selectively adjusted adjust forward and/or rearward relative to the front surface 28 of the receiver bottom element 24 by a user. For example, the slot 38 can be a longitudinal slot sized and shaped to allow a portion of the catch to slidingly engage the walls 40 of the slot in a direction extending between the front surface 28 and the rear surface 30 of the receiver bottom element. Similarly, the slot 38 can be sized and shaped to restrict or prevent left-to-right and right-to-left movement of the catch 20 relative to the receiver bottom element 24.

Figure 5:
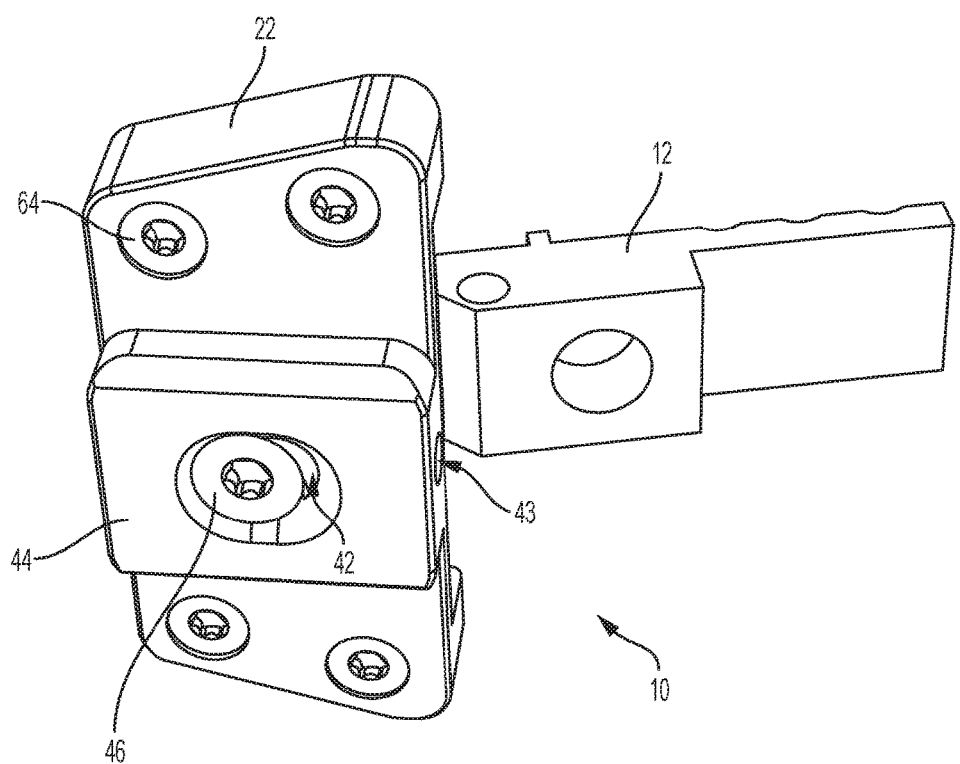
FIG. 5 is a lower perspective view one aspect of the receiver element of FIG. 1A.

Referring now to FIG. 5, a first aperture 42 can be defined in a lower surface 44 of the receiver element 22. In one aspect, the first aperture can extend from the lower surface through at least a portion of the receiver element and to the slot 38. In this aspect, the first aperture 42 can be sized and shaped such that a first set screw 46 can pass through the first aperture and to the catch 20. In a further aspect, the first aperture 42 can be an elongate aperture so that the position of the first set screw relative to the receiver bottom element 24 can be selected by the user. That is, in use and described more fully below, the position of the catch and the position of the first set screw 46 can be selected by a user before tightening the first set screw to the catch. As such, loosening of the first set screw 46 can permit longitudinal movement of the catch 20 relative to the headgear mount system 10. For example, when matingly engaged with the catch, the first set screw can prevent a catch platform 52 (illustrated in FIG. 6) of the catch from undesirably moving out of the slot 38 of the receiver element 22. In another example, when matingly engaged with the catch 20, the first set screw 46 can prevent the catch platform from undesirably sliding in the slot of the receiver element.

A second aperture 43 can be defined in the front surface 28 of the receiver element 22, according to one aspect. The second aperture can extend from the front surface through at least a portion of the receiver element and to the slot 38. In this aspect, the second aperture 43 can be sized and shaped such that a second set screw 58 can pass through the second aperture and to the catch 20. In use and described more fully below, the position of the catch and the position of the second set screw 58 can be selected by a user to prevent longitudinal movement of the catch toward the front surface 28 of the receiver element 22 beyond a predetermined distance. That is, instead of engaging threads in the catch 20, the second set screw can act as a stop to limit longitudinal movement of the catch. For example, the second set screw can extend into the slot 38 and can prevent the catch 20 from sliding in the slot beyond the end of the second set screw 58. In another aspect, a longitudinal axis of the first aperture 42 and a longitudinal axis of the second aperture 43 can be substantially normal. Alternatively, the longitudinal axis of the first aperture can be at an acute angle relative to the longitudinal axis of the second aperture.

Figure 6:
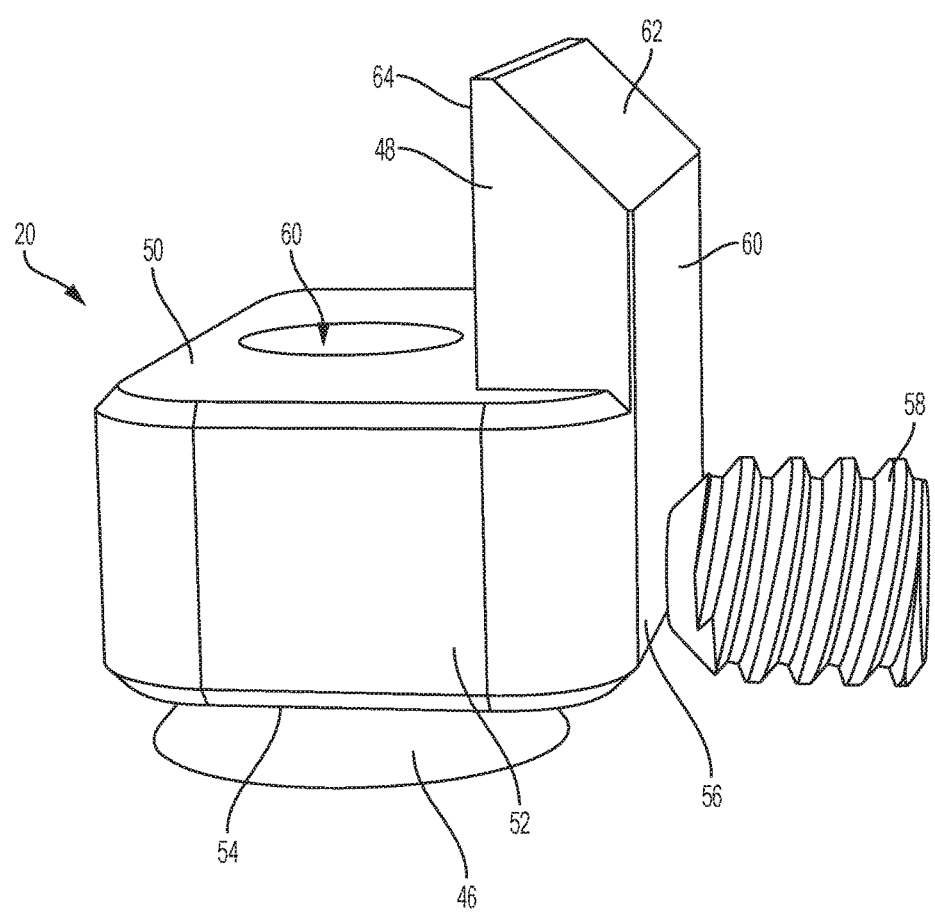
FIG. 6 is perspective view of the adjustable catch of FIG. 1A, according to one aspect.

In one aspect, the adjustable catch 20 can comprise a tooth 48 extending upward from an upper surface 50 of the catch platform 52, as illustrated in FIG. 6. The platform can have a platform width sized to slidingly engage the slot 38 of the receiver bottom element 24. That is, the platform width can be sized so that the platform 52 can slide longitudinally along the slot without twisting relative to the slot 38. In another aspect, the platform can have a platform length that is less than the length of the slot. The platform can also have a lower surface 54 opposed to the upper surface and a front surface 56 configured to engage a second set screw 58. In a further aspect, a bore 60 in the lower surface can extend through the platform 52 and to the upper surface 50. In this aspect, the bore can be sized and shaped to matingly engage the first set screw 46.

The tooth 48 of the adjustable catch 20 can have a front surface 60 substantially parallel to the front surface 56 of the catch platform 52. The tooth can also have an upper surface 62 beveled relative to the front surface of the tooth 48. The beveled upper surface of the catch can be configured to allow a portion of the male protrusion 12 to more easily slide from the front surface of the tooth, over the upper surface 62 and to a rear surface 64 of the tooth 48.

To assemble the headgear mount system 10, the adjustable catch 20 can be positioned in the slot 38 of the female receiver cavity 18. When assembled, in one aspect, at least a portion of the tooth 48 can extend upward from the upper surface 26 of the receiver bottom element 24 and into the female receiver cavity. In another aspect, the tooth can extend into the female receiver cavity 18 a predetermined distance from the upper surface 26. The predetermined distance can be selected, for example, to allow the tooth to engage the male protrusion of any bayonet connector 12. In still a further aspect, the tooth 40 can have a catch width sized so that when the tooth is engaged with the clipping lever 16 of the bayonet connector 12, the tooth has a surface area sufficient enough to securely attach to the clipping lever. It is contemplated that the headgear mount system can be held together with conventional fasteners such as screws 64, dowel pins 66 and the like.

When assembled, the catch 20 can slide therein the slot 38 of the female receiver cavity 18 a predetermined distance. For example, the catch can slide about and between a first catch position, in which the catch 20 is a first distance from the front surface 28 of the receiver element 22, and a second catch position in which the catch is a second distance from the front surface of the receiver element that is less than the first distance. Thus, the catch can slide in the female receiver cavity 18 longitudinally relative to the receiver element so that the clipping lever 16 of a bayonet connector 12 can be securely attached to the headgear mount system 10 regardless of the size of the bayonet connector.

Figure 3A:
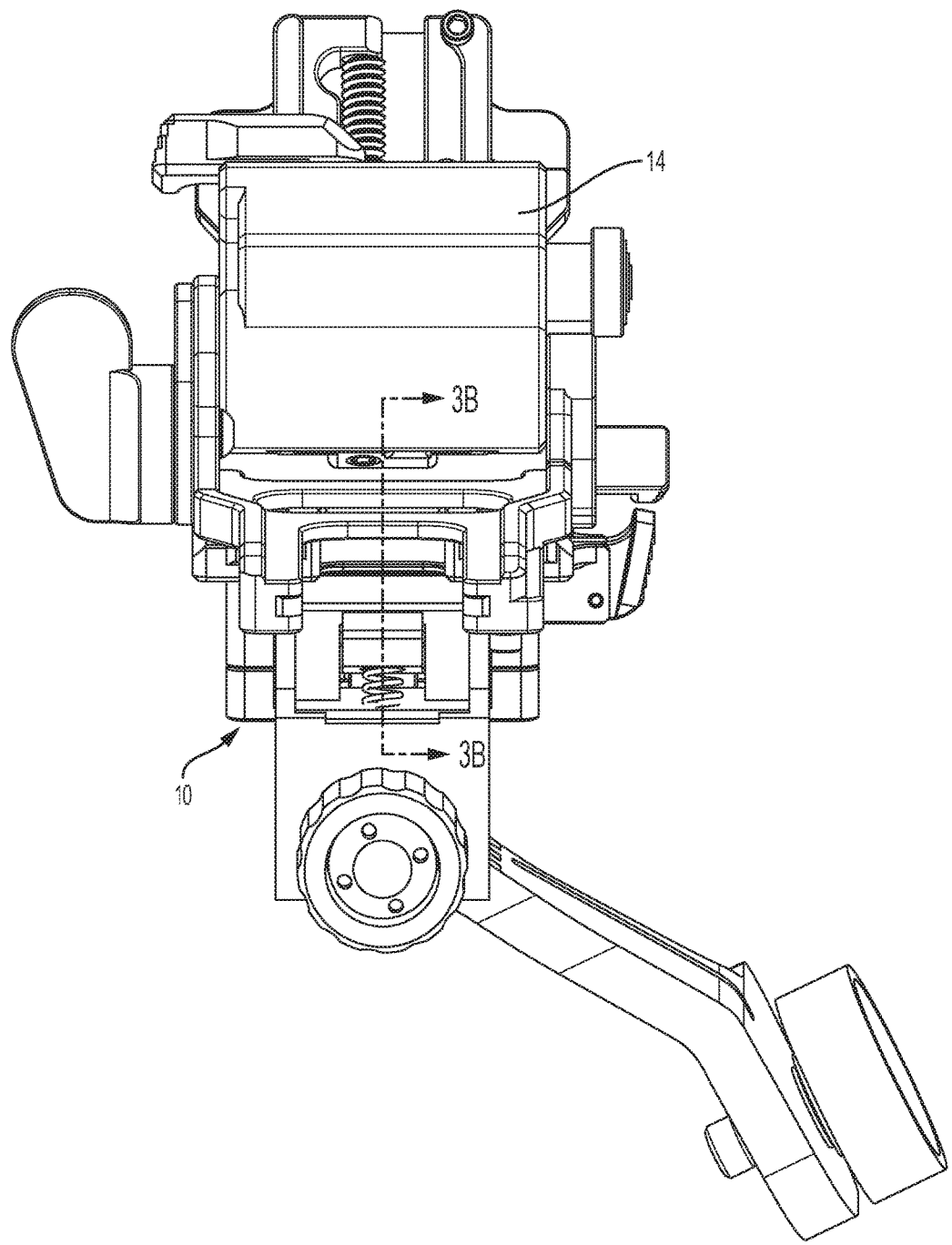
FIG. 3A is a front elevational view of the headgear mount system of FIG. 1.
Figure 3B:
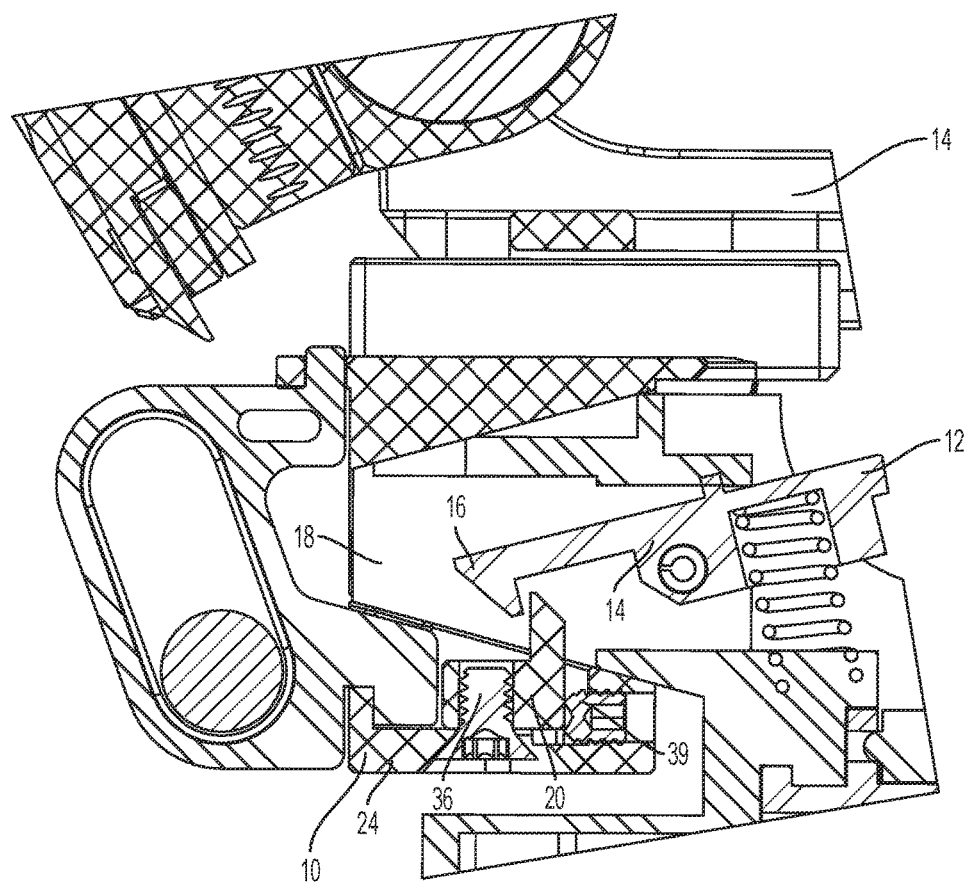
FIG. 3B is a cut away side elevational view of the headgear mount system of FIG. 3A taken along line E-E of FIG. 3A.

In use, the clipping lever 16 of the bayonet connector 12 can be inserted into the female receiver cavity 18 of the headgear mount system 10, as shown in FIG. 3B. If the clipping lever 16 does not engage the tooth 48 of the catch 20 when the bayonet connector 12 is inserted into the cavity, the connection between the bayonet connector and the headgear mount system can became loose. To avoid this situation, the catch 20 can be adjustable forward and/or rearward by loosening the first set screw 46 and/or the second set screw 58 and moving the catch 20 longitudinally into a position in which the clipping lever can engage the tooth. In this engaging position, the first set screw can be tightened to securely fix the position of the catch 20 relative to the receiver bottom element 24. Then, the second set screw can be tightened to exert a longitudinal force onto the catch 20. Tightening of the first set screw 46 can frictionally hold the catch in place and positioning of the second set screw 58 can provide for additional securement of the catch 20 relative to the receiver bottom element.

With the catch 20 in the desired, engaging position relative to the female receiver cavity 18, the clipping lever 16 of the bayonet connector 12 can be inserted into the female receiver cavity of the headgear mount system 10 and the clipping lever can engage the tooth 48 of the catch 20 to securely attach the bayonet connector to the headgear mount system. Upon disengagement of the clipping lever 16 from the tooth and removal of the bayonet connector from the headgear mount system, the position of the catch can be adjusted, if desired, so that the headgear mount system 10 can accommodate a bayonet connector 12 having a different size.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A headgear mount system configured for attaching a bayonet connector having a clipping lever to a headgear mount, the system comprising:
   a receiver element defining a female receiver cavity defined by opposing side walls and a bottom element, said cavity configured to receive a portion of the bayonet connector therein, and wherein a slot is defined in said bottom element of the female receiver cavity; and
   an adjustable catch positioned in the slot of the receiver element, the catch comprising:
      a catch platform configured to slidingly engage the slot defined in the receiver element; and
      a tooth configured to engage the clipping lever of the bayonet connector;
   wherein the catch is adjustable about and between a first catch position, in which the catch is a first distance from a front surface of the receiver element, and a second catch position in which the catch is a second distance from the front surface of the receiver element that is less than the first distance.

2. The headgear mount system of claim 1, wherein the receiver element comprises a receiver top element and a receiver bottom element that are coupled together and that cooperate to define the female receiver cavity.

3. The headgear mount system of claim 2, wherein an upper surface of the receiver bottom element is tapered from the front surface of the receiver element toward a rear surface such that a cavity height of the female receiver cavity decreases from the front surface toward the rear.

4. The headgear mount system of claim 3, wherein a first sidewall and a second sidewall of the receiver bottom element are tapered from the front surface of the receiver element toward the rear surface such that the cavity width decreases from the front surface toward the rear.

5. The headgear mount system of claim 1, wherein a first aperture is defined in a lower surface of the receiver element and extends from the lower surface through the receiver element and to the slot, and wherein the first aperture is sized and shaped such that a first set screw can pass through the first aperture and to the catch to securely fix the catch to the receiver element.

6. The headgear mount system of claim 5, wherein the first aperture is an elongate aperture such that the position of the first set screw relative to the receiver element is adjustable by a user.

7. The headgear mount system of claim 6, wherein a second aperture is defined in the front surface of the receiver element and extends from the front surface through the receiver element and to the slot, and wherein a second set screw prevents longitudinal movement of the catch toward the front surface beyond a predetermined distance.

8. The headgear mount system of claim 7, wherein a longitudinal axis of the first aperture and a longitudinal axis of the second aperture are substantially normal.

9. The headgear mount system of claim 1, wherein the catch platform has a lower surface, an opposed upper surface and a front surface extending therebetween, wherein a bore defined in the lower surface extends through the platform and to the upper surface, and wherein the bore is configured to matingly engage at least one set screw.

10. The headgear mount system of claim 9, wherein the tooth extends away from the upper surface of the catch platform and into the female receiver cavity.

11. The headgear mount system of claim 10, wherein the tooth of the adjustable catch has a front surface substantially parallel to the front surface of the catch platform, and wherein the tooth has an upper surface beveled relative to a front surface of the tooth.

12. The headgear mount system of claim 1, wherein the adjustable catch comprises at least one set screw configured to securely fix the catch to the receiver element.

13. A mounting adapter for attaching a bayonet connector having a clipping lever to a headgear mount, the adapter comprising:
    a receiver element defining a female receiver cavity extending from a front surface of the receiver element towards a rear surface, wherein the female receiver cavity is configured for receiving a portion of the bayonet connector therein, and wherein a longitudinal slot is defined in a lower surface of the female receiver cavity; and
    an adjustable catch positioned in the longitudinal slot of the receiver element, the catch comprising:
        a catch platform having a platform width configured to slidingly engage the slot defined in the receiver element;
        a tooth extending away from an upper surface of the catch platform and into the female receiver cavity, the tooth configured to engage the clipping lever of the bayonet connector; and
        at least one set screw, the set screw configured to securely fix the catch to the receiver element,
    wherein the catch within said female receiving cavity is adjustable about and between a first catch position, in which the catch is a first distance from the front surface of the receiver element, and a second catch position in which the catch is a second distance from the front surface of the receiver element that is less than the first distance.

* * * * *